Dec. 16, 1924. 1,519,582
J. HARRIS
BLOW PIPE OR TORCH
Filed March 27, 1920 2 Sheets-Sheet 1
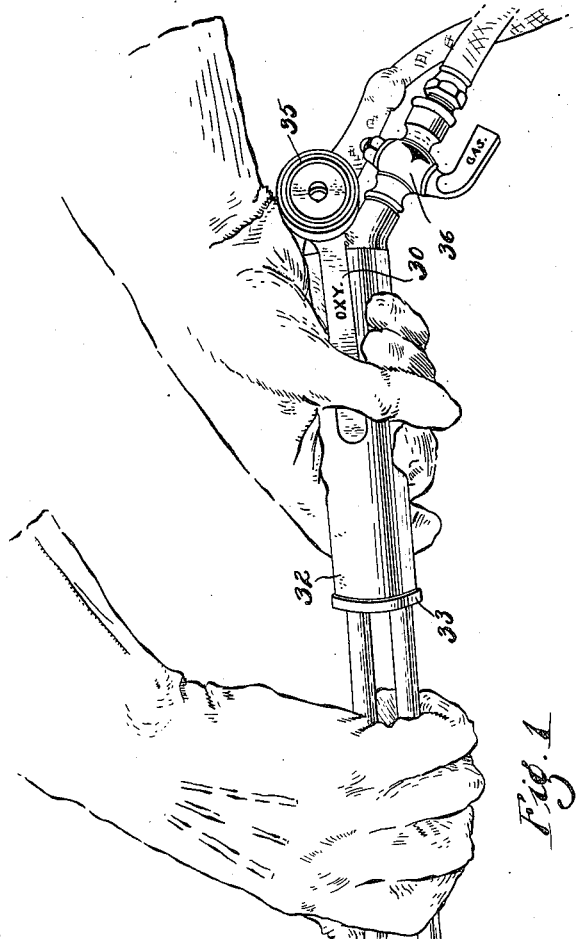
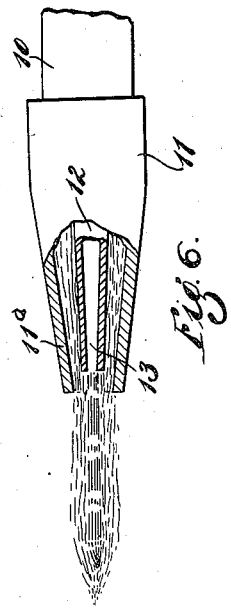
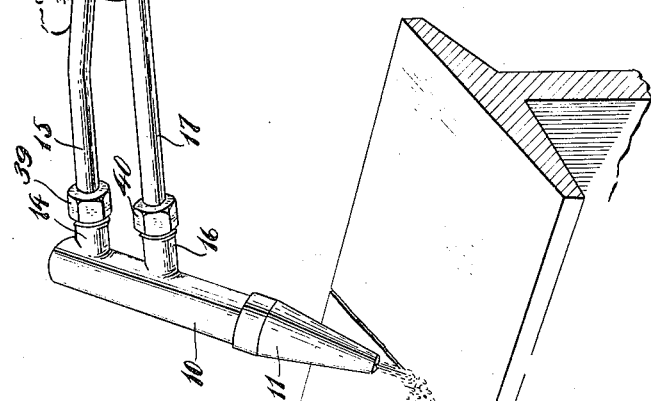
Inventor
John Harris,
By Hull, Smith, Brock & West, Att'ys.

Dec. 16, 1924. 1,519,582
J. HARRIS
BLOW PIPE OR TORCH
Filed March 27, 1920 2 Sheets-Sheet 2
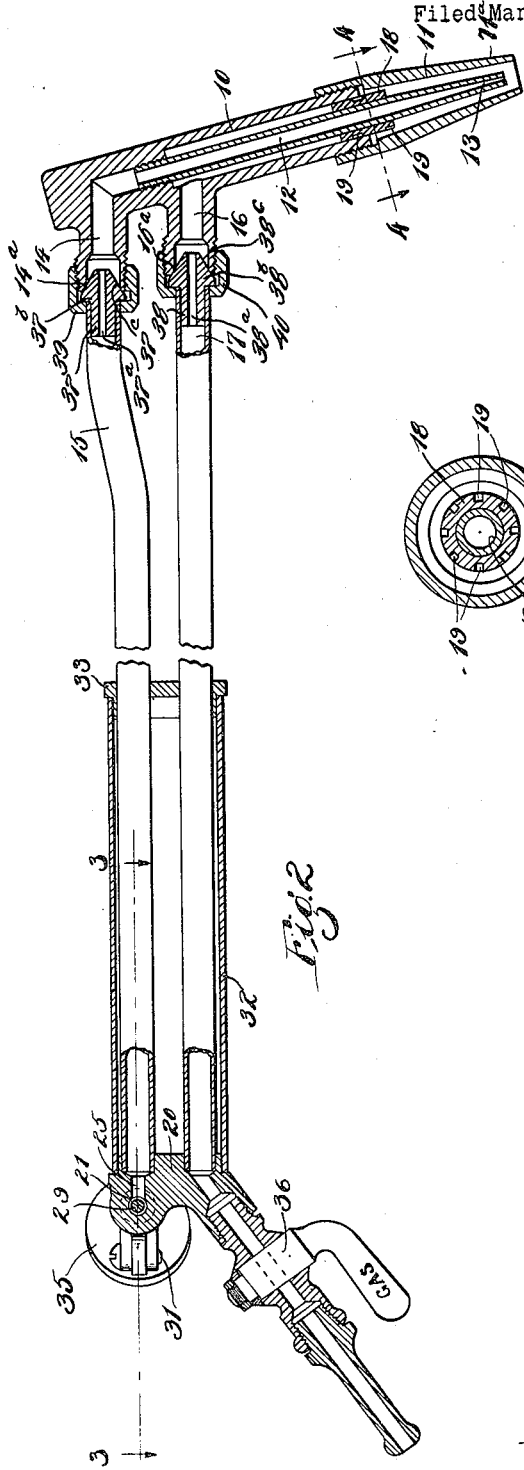

Patented Dec. 16, 1924.

1,519,582

UNITED STATES PATENT OFFICE.

JOHN HARRIS, OF LAKEWOOD, OHIO.

BLOW PIPE OR TORCH.

Application filed March 27, 1920. Serial No. 369,428.

*To all whom it may concern:*

Be it known that I, JOHN HARRIS, a citizen of the United States, residing at Lakewood, in the county of Cuyahoga and State of Ohio, have invented a certain new and useful Improvement in Blow Pipes or Torches, of which the following is a full, clear, and exact description, reference being had to the accompanying drawings.

This invention relates generally to blow pipes, torches or burners which are intended for cutting steel, iron or other metals in and through the use of an oxygen jet, or for heating and shaping plates, castings and alloy steels, as well as other forms of iron and steel products, the object of the invention being to provide an exceedingly simple, durable and efficient construction of torch.

Another object of the invention is to provide a torch in which two supply pipes only are employed, one for supplying the combustible gas to the head of the torch and the other for conducting the oxygen for mixture with the combustible gas to provide a heating flame, and for performing the cutting operation; a further object is to provide a torch in which two valves only are employed in connection with the supply pipes for oxygen and combustible gas; a still further object of the invention is to provide a torch which can be moved either toward or away from the operator across the metal being cut and which will not be subject to back-fire when the torch is moved forwardly or away from the operator. This forward direction of the flame is important because the heating jet does not travel in the cut or crevice produced and consequently does not slag or melt the severed surfaces of the metal at the rear of the point where the action of the torch is taking place.

Heretofore in cutting torches of this character of which I am aware and which employ detonating gases to preheat, it has been necessary to drag the torch rearwardly toward the operator across the surface to be cut for the reason that when such torches were moved forwardly sparks and slag were thrown up to such an extent as to cause explosive back-fire. Furthermore, when these torches have been drawn rearwardly over the surface to be cut, there has always been more or less accumulation of slag at the rear for the reason that the preheating flame extended rearwardly thereby rendering the cut ugly and uneven; and it is, therefore, the object of my invention to provide a torch which can be moved in either direction and which will not be subject to back-fire, which will, by the force of the discharged gases and flame, blow away slag when moving forwardly, and which will produce a clear, clean cut.

Another object of the invention is to provide a torch in which the high pressure oxygen for cutting may be turned on instantly without extinguishing the preheating flame.

A still further object of the invention is to provide a torch in which the combustible mixture of combustible gas and oxygen can be easily regulated and in which the full pressure of oxygen for cutting can be quickly and easily obtained through the same valve which is used for controlling the supply of oxygen for mixture with the combustible gas to form the preheating jet.

With these and certain other objects in view, which will appear hereinafter, my invention consists in its preferred embodiment of a tubular head having a contracted outlet or discharge opening, said head being adapted to receive the combustible or preheating gas, and a tube positioned in said head and adapted to receive oxygen, the discharge end of said tube being tapered, the tapered end being located within the contracted outlet of the head and at a point adjacent the discharge end thereof.

The invention consists also in so proportioning and positioning the tapered end of the oxygen-supplying tube with reference to the contracted end of the gas-supplying head that there shall always be an escape for the combustible gas irrespective of the pressure or volume of the oxygen.

The invention consists also in certain details of construction and peculiarities of arrangement, all of which will be described hereinafter and pointed out in the claims.

In the drawings forming a part of this specification Fig. 1 is a perspective view illustrating the manner of using a torch constructed in accordance with my invention; Fig. 2 is a longitudinal sectional view of the torch; Fig. 3 is a detail sectional view on the line 3—3 of Fig. 2; Fig. 4 is a detail sectional view on the line 4—4 of Fig. 2; Fig. 5 is a detail view of the tube for carrying the cutting gas; Fig. 6 is an enlarged diagrammatic detail showing the relative arrangement of the contracted end of the head and the tapered end of the oxygen tube.

In the practical embodiment of my invention I employ a hollow head 10, which is preferably cylindrical in shape, closed at the rear end and provided with a tip 11 having a contracted or tapering mouth 11ª at the forward end, said contracted tip being preferably detachably connected to the cylindrical head as by screw threads or any other suitable means.

Within the head and tip, I arrange a tube 12 through which passes the cutting gas, such as oxygen, the forward end of this tube 12 being tapered, as shown at 13. The tapered forward end 13 of the tube being adjacent to and entirely within and arranged centrally of the discharge end of the contracted mouth 11ª, with its forward delivery end located some distance inwardly from the forward end of said tip, a definite amount of combustible gas is discharged from the mouth irrespective of the pressure or volume of cutting gas emerging from the tapered end of the tube 12. The outer taper of the oxygen supply tube preferably conforms substantially to the internal tapered bore of the outlet tip 11, so as not to restrict or interfere with the proper flow of the combustible gas.

The head 10 is formed with a pipe connection 14 to which the oxygen pipe 15 is coupled, it being noted that the tube 12 is secured in the head so as to communicate with the oxygen pipe and connection. The head is also constructed with a similar connection 16 which communicates with the cylindrical body of the head and to which the combustible-gas pipe 17 is coupled. The tube is maintained centrally within the head by means of a cylindrical spacing block 18, the periphery of which is spirally grooved at 19 so that the combustible gas can pass freely to the contracted end of the head.

It will, therefore, be understood that the combustible gas passes into the cylindrical head by the pipe 17 and connection 16, that the oxygen or cutting gas passes into the tube 12 through the pipe 15 and connection 14; and the tapered end 13 of this tube is brought very close to the discharge end of the contracted mouth 11ª so that the full force and effect of the oxygen jet can be directed, when desired, upon the metal to be cut.

The oxygen supply pipe 15 and the combustible or preheating gas supply pipe 17 are secured at their rear ends in a valve casing 20 which is provided with the proper couplings for connecting the torch with the gas and oxygen supplies.

The valve casing 20 has a transverse bore 21 provided therein, said bore being of less diameter at the center than at the ends, thereby providing a valve seat 22 adjacent one end and a packing seat 23 adjacent the opposite end. A passage 24 leads into the valve casing and communicates with the coupling by means of which the oxygen passes to the supply pipe 15, through the bore 21 and passage 25. A valve 26 is adapted to seat upon the valve seat 22, the stem of said valve extending through the bore 21 and beyond the opposite side of the valve casing, suitable packing being placed around said stem and held in place by a suitable plug and gasket 26ª. A coil spring 27 bears against the valve for the purpose of seating the same, said spring being contained within a socketed nut 28 screwed into the valve casing, the valve having a pin 29 extending into the spring for the purpose of positioning the same with reference to the valve.

A hand lever 30 is pivoted at 31 to the end of the valve casing 20, said lever extending forwardly alongside the supply pipes 15 and 17, which in practice I prefer to encase at their rear portions with a sleeve 32 attached at its rear end to the valve casing and at its forward end to a spacing collar 33. This sleeve provides a convenient handle for the torch, and the lever 30, resting adjacent thereto, can be quickly and easily operated by pressing the thumb upon said lever, the movement of the lever causing the same to contact with the projecting end of the valve stem thereby unseating the valve and permitting the passage of oxygen to the pipe 15. The lever 30 engages the valve stem by means of an adjusting screw 34, said screw being provided with a milled head 35. By turning this screw so as to exert a certain amount of pressure upon the valve stem, the valve can be partially opened so as to permit a sufficient quantity of oxygen to pass through to commingle at the mouth 11ª with the combustible gas which passes through the supply pipe 17 into the head, the passage of the combustible gas to the torch being controlled by the cock 36 located in the coupling connecting the combustible gas supply pipe to the valve casing 20.

In operation, the torch is coupled up with the supplies for oxygen and a combustible gas. Any suitable preheating gas other than acetylene, such as hydrogen, can be used in connection with this form of torch; and, by regulating the screw 34 to bear upon the stem of the valve, the inlet valve can be regulated so that the desired quantity of oxygen will be permitted to pass through the oxygen supply pipe to commingle at the mouth with the combustible gas which passes through the gas supply pipe 17 to the cylindrical head 10. After the desired combustion of commingled gases has occurred, it is necessary only to press upon the hand lever 30, moving the same in toward the handle 31, thereby to completely open the valve 26 and permit the full charge of oxygen to pass through the pipe 15 into the tapered tube 12. The tapered end of this tube is so positioned within the contracted end of the mouth 11ª that, no matter how great the pressure of the oxygen or cutting gas, it will be incapable of snuffing out the flame at the tip, as there will always be a sufficiently large annular space surrounding the cutting jet through which the combustible gas can escape.

By arranging the tapered tube in the manner herein shown, I provide a torch which can be moved forwardly across the surface, to be cut, as indicated in Fig. 1, and which will not only effectively cut the metal but will also serve to blow away the slag and thereby produce a clean, clear cut; and furthermore, the proper positioning of these parts effectively prevents any explosive back-fire, which heretofore has occurred when torches have been moved forwardly across the surfaces to be cut.

It will thus be seen that I provide an exceedingly simple and highly efficient construction of torch capable of carrying out and accomplishing all of the objects hereinbefore referred to.

The head 10 is detachably connected to the pipes 15 and 17 and by means of plugs 37 and 38, respectively, each having a central bore 37ª and 38ª, respectively, and each provided with a head 37ᵇ and 38ᵇ, respectively. Each head is provided with a conical surface, 37ᶜ and 38ᶜ, respectively, adapted to engage a beveled seat 14ª and 16ª on the ends of the connections 14 and 16, respectively. The plugs are forced to their seats by means of shouldered nuts 39 and 40 engaging the rear sides of the heads 37ᵇ and 38ᵇ, respectively and threaded into the ends of the connections 14 and 16. This construction affords means for conveniently connecting the pipes 15 and 17 and disconnecting the same from the head 10; it also secures a leak-proof joint between the pipes and the head.

Having thus described my invention, what I claim is:—

1. A cutting torch comprising a hollow head having a tip provided with a tapered delivery end. the said head being provided with a passage for supplying oxygen gas into the central upper portion of the head, a tube secured in the upper portion of the head and forming a continuation of said passage, the outer or lower end of the said tube being contracted and forming with the corresponding portion of the tip a free and unobstructed annular passage surrounding the lower or delivery portion of the said tube, and the upper portion of the tube being spaced from the surrounding portion of the head to provide an annular chamber therebetween, means for supplying a combustible gas only to said chamber, a spacing block arranged upon the tube at a considerable distance from the lower or delivery end thereof, the block being constructed to permit the passage of the combustible gas to the annular space surrounding the lower or delivery portion of the said tube and the lower or delivery end of said tube being located above the corresponding end of said tip.

2. In a cutting torch, the combination, with a head having a central passageway for cutting oxygen and a passageway for preheating gases surrounding the central passageway, a valve casing having combustible and cutting gas connections leading thereto, combustible and cutting gas pipes leading from the valve casing and communicating respectively with said passageways, a spring pressed valve within the casing, and a lever for completely unseating said valve, together with adjustable means carried by said lever adapted to engage and partially open said valve.

3. In a cutting torch, the combination, with a head having a central passageway for cutting oxygen and a passageway for preheating gases surrounding the central passageway, a valve casing having a combustible and a cutting gas connection leading thereto, combustible and cutting gas pipes leading from the valve casing and communicating respectively with the said passageways, a spring pressed valve arranged in the casing and having a stem projecting therefrom, a hand lever pivoted to the casing and an adjustable screw carried thereby and adapted to engage the projecting end of the valve stem whereby said valve can be partially opened, the movement of the lever serving to completely open said valve.

In testimony whereof, I hereunto affix my signature.

JOHN HARRIS.